United States Patent
Fu et al.

(10) Patent No.: US 11,774,829 B1
(45) Date of Patent: Oct. 3, 2023

(54) ELECTRONIC DEVICE AND CONTROL METHOD THEREFOR

(71) Applicant: Beijing Xiaomi Mobile Software Co., Ltd., Beijing (CN)

(72) Inventors: Jiyuan Fu, Beijing (CN); Tao Yu, Beijing (CN); Zehong Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/936,309

(22) Filed: Sep. 28, 2022

(30) Foreign Application Priority Data

Jun. 24, 2022 (CN) .......................... 202210731281.2

(51) Int. Cl.
*G03B 17/02* (2021.01)
*G03B 17/55* (2021.01)

(52) U.S. Cl.
CPC ............. *G03B 17/02* (2013.01); *G03B 17/55* (2013.01)

(58) Field of Classification Search
None
See application file for complete search history.

(56) References Cited

U.S. PATENT DOCUMENTS

| | | | | |
|---|---|---|---|---|
| 6,061,087 A * | 5/2000 | Schieltz | ........... | G08B 13/19619 348/151 |
| 7,612,799 B1 * | 11/2009 | Frank | ..................... | H04N 23/51 250/339.04 |
| 7,671,919 B2 * | 3/2010 | Iwasaki | .................. | H04N 23/55 348/374 |
| 11,106,115 B2 * | 8/2021 | Mizutani | ................. | G03B 17/02 |
| 2004/0169771 A1 * | 9/2004 | Washington | ........... | H04N 23/52 348/E5.025 |
| 2006/0092506 A1 * | 5/2006 | Tsuchiya | ................ | G02B 21/30 359/368 |
| 2008/0314899 A1 * | 12/2008 | Berkey | .................. | H05K 5/068 220/203.01 |
| 2016/0044822 A1 * | 2/2016 | Imai | ........................ | E05F 15/71 165/96 |
| 2017/0182952 A1 * | 6/2017 | Carlson | ................... | B60S 1/026 |
| 2017/0363278 A1 * | 12/2017 | Furuuchi | ................. | F21S 41/25 |
| 2018/0229690 A1 * | 8/2018 | Adachi | ................... | B60S 1/023 |
| 2018/0328580 A1 * | 11/2018 | Tezuka | ................ | B01D 53/268 |
| 2020/0101945 A1 * | 4/2020 | Trebouet | ............. | H05K 5/0217 |

* cited by examiner

*Primary Examiner* — Rodney E Fuller (74) *Attorney, Agent, or Firm* — McCoy Russell LLP (57) ABSTRACT

An electronic device includes an accommodating chamber configured to accommodate a camera module, one side, opposite to a photosensitive component of the camera module, of the accommodating chamber is provided with a light-permeable piece, the accommodating chamber is provided with a first opening communicating an internal with an external of the accommodating chamber, the first opening is provided with an opening/closing piece, and the opening/closing piece has a first position and a second position, the opening/closing piece is configured to close the first opening to seal the accommodating chamber at the first position and to open the first opening to discharge moist airflow at the second position.

18 Claims, 4 Drawing Sheets

ELECTRONIC DEVICE AND CONTROL METHOD THEREFOR

CROSS-REFERENCE TO RELATED APPLICATION

The present application claims priority to Chinese Patent Application No. 202210731281.2, filed on Jun. 24, 2022. The entire contents of the above-listed application are hereby incorporated by reference for all purposes.

BACKGROUND

With the continuous expansion of usage scenarios of users, electronic devices such as mobile phones will be switched between high and low temperature or humidity scenarios. Under some scenarios, such as a low temperature and high humidity scenario, water vapor inside the electronic device will condense on a camera lens, forming water mist that cannot be wiped from the outside, and affecting the user experience.

In order to solve the problem of fogging of the camera lenses, a solution of improving space airtightness is tried to be adopted in the related art, that is, a camera module is accommodated in a completely enclosed space. Considering that the structure of the camera module itself and the connection with a mainboard are relatively complex, it is difficult to achieve complete sealing, resulting in high design difficulty, and an antifogging effect being not as good as expected.

SUMMARY

The disclosure relates to the technical field of electronic devices, in particular to an electronic device that can prevent fogging of camera lenses and a control method therefor.

According to a first aspect of an example of the disclosure, an electronic device is provided and includes:

an accommodating chamber configured to accommodate a camera module, one side, opposite to a photosensitive component of the camera module, of the accommodating chamber being provided with a light-permeable piece, the accommodating chamber being provided with a first opening communicating an interior with an exterior of the accommodating chamber, the first opening being provided with an opening/closing piece having a first position and a second position, wherein, the opening/closing piece is configured to close the first opening to seal the accommodating chamber at the first position and to open the first opening to discharge moist airflow at the second position.

According to a second aspect of an example of the disclosure, a method for controlling an electronic device is provided, the electronic device comprises: an accommodating chamber configured to accommodate a camera module, one side, opposite to a photosensitive component of the camera module, of the accommodating chamber being provided with a light-permeable piece, the accommodating chamber being provided with a first opening communicating an interior with an exterior of the accommodating chamber, the first opening being provided with an opening/closing piece having a first position and a second position, wherein, the opening/closing piece is configured to close the first opening to seal the accommodating chamber at the first position and to open the first opening to discharge moist airflow at the second position;

the method for controlling the electronic device comprises:

obtaining at least one of a humidity information inside and outside an accommodating chamber; and controlling an opening/closing piece to be switched between a first position and a second position in response to the obtained humidity information.

BRIEF DESCRIPTION OF THE DRAWINGS

The accompanying drawings herein incorporated as a part of the specification show examples conforming to the disclosure and are used in conjunction with the specification to explain the principle of the disclosure.

DETAILED DESCRIPTION

Examples are described in detail here and are represented in the accompanying drawings. When the following descriptions refer to the accompanying drawings, unless otherwise indicated, the same numbers in different accompanying drawings indicate the same or similar elements. The implementations described in the following examples do not represent all implementations consistent with the disclosure. On the contrary, they are merely examples of apparatuses and methods consistent with some of the aspects of the disclosure.

In the absence of an indication to the contrary, the position words used such as "up, down, left and right" are defined in accordance with directions indicated in the corresponding drawings, while "inside" and "outside" indicate the inside and outside of corresponding part own contours. In addition, terms such as "first" and "second" used in the disclosure are intended to distinguish one element from another element and do not have sequence and importance.

It needs to be illustrated that all actions to obtain signals, information or data in the disclosure are carried out in accordance with the relevant data protection regulations and policies of the country where they are located and with the authorization of the owner of the corresponding apparatus.

Figure 1:
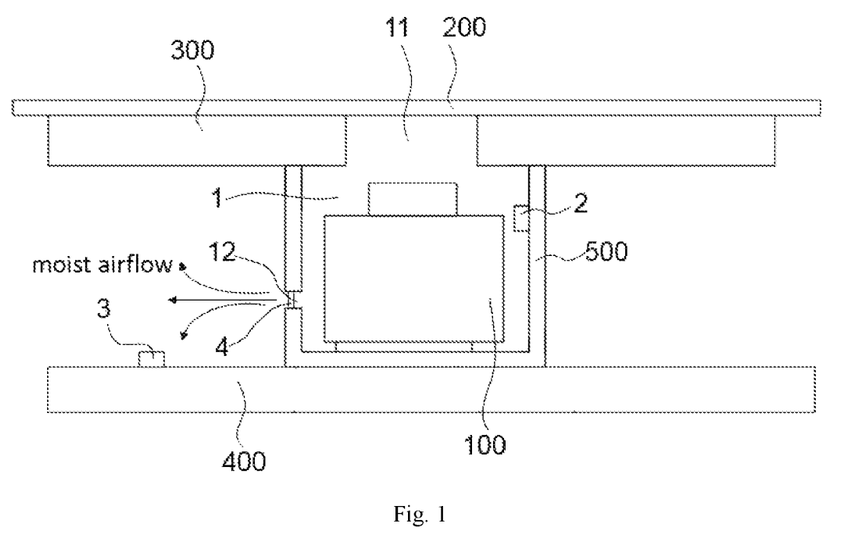
FIG. 1 is a partial schematic diagram of an electronic device illustrated according to an example.

The disclosure provides an electronic device, the electronic device includes, but not limited to, terminal devices such as mobile phones, notebook computers and tablet personal computers with a camera function, or photo devices such as cameras. As shown in FIG. 1, the electronic device of the disclosure includes an accommodating chamber 1 configured to accommodate a camera module 100. The accommodating chamber 1 separates an interior of the electronic device into two parts, namely, an internal zone of the accommodating chamber 1 and an external zone of the accommodating chamber 1, the internal zone of the accommodating chamber 1 is configured to accommodate the camera module 100 and form a sealing space according to the needs, and the external zone of the accommodating chamber 1 is the zone inside the electronic device except the accommodating chamber 1.

One side, opposite to the photosensitive component of the camera module 100, of the accommodating chamber 1 is provided with a light-permeable piece 200. Taking the mobile phone as an example, the light-permeable piece 200 may be a transparent lens arranged on the electronic device cover 300 and at least covers the photosensitive component of the camera module 100, so as to enable lights to penetrate through the photosensitive component. The accommodating chamber 1 is provided with a first opening 12 communicating with the internal and the external of the accommodating chamber 1, and the first opening 12 is provided with an opening/closing piece 4.

The opening/closing piece 4 has a first position and a second position, when being at the first position, the opening/closing piece 4 closes the first opening 12, and the accommodating chamber 1 is a sealing space; and when being at the second position, the opening/closing piece 4 opens the first opening 12, and the first opening 12 is configured to discharge moist airflow. The opening/closing piece 4 may be configured to a valve arranged at the first opening 12 or a board capable of completely covering the first opening 12 or other structures capable of arbitrarily sealing the first opening 12. The opening/closing piece 4 can be controlled by active control or passive control by monitoring humidity as will be described later. The active control mode, that is, a user may actively control the opening/closing piece 4, for example, under some scenes, the light-permeable piece 200 has produced visible mist, at the moment, the user may open the opening/closing piece 4 through buttons or a built-in APP, so as to enable the moist airflow in the accommodating chamber 1 to be discharged outside, and mist on the light-permeable piece 200 is gradually eliminated. Under other scenes, the light-permeable piece 200 has not produced obvious mist, however, the user experience judges that there is a risk of mist, and the opening/closing piece 4 may be opened in advance.

The technical solutions provided by the examples of the disclosure may include the following beneficial effects: by arranging the first opening 12 capable of communicating with the internal environment and the external environment of the accommodating chamber, and the first opening 12 is provided with the opening/closing piece 4 capable of opening and closing the first opening 12. In this way, when the light-permeable piece 200 has produced mist or the internal humidity of the accommodating chamber 1 has the risk of producing the mist, the opening/closing piece 4 is at the second position to open the first opening 12, the moist airflow inside the accommodating chamber 1 is discharged outside, so that the internal humidity of the accommodating chamber 1 is reduced. Because a low-temperature and high-humidity environment is a necessary factor for the formation of mist, keeping the interior of the accommodating space 1 to be dry can prevent the problem of formation of the mist on the transmitting piece 200 due to excessive humidity. When the transmitting piece 200 has not produced mist and the internal humidity of the accommodating chamber 1 has not reached the condition of mist production, the opening/closing piece 4 is at the first position to close the accommodating chamber 1, which can avoid the moist airflow outside the accommodating chamber 1 to enter the interior.

In the disclosure, the opening/closing piece 4 may be configured to be at the second position when the internal humidity of the accommodating chamber 1 is greater than the external humidity, and to be at the first position when the internal humidity of the accommodating chamber 1 is smaller than or equal to the external humidity. Under some conditions, when the internal humidity of the accommodating chamber 1 is greater than the external humidity, the opening/closing piece 4 is at the second position, at the moment, the first opening 12 is opened, and an air pressure has difference due to different humidity inside and outside the accommodating chamber 1. In order to maintain the balance of the air pressure, the air inside and outside the accommodating chamber 1 flows, such as an airflow direction in FIG. 1, a final result is to enable the internal humidity of the accommodating chamber 1 to be reduced, and the interior of the accommodating chamber 1 is kept dry. Under other conditions, when the internal humidity of the accommodating chamber 1 is smaller than or equal to the external humidity, the opening/closing piece 4 is at the first position, at the moment, the first opening 12 is closed, because the risk of producing mist in the accommodating chamber 1 is small, if the internal and the external of the accommodating chamber 1 still communicate with each other, resulting in increasing of the internal humidity, which is not conductive to preventing mist. In addition, the electronic device provided by the disclosure may be dynamically adjusted according to a humidity difference inside and outside the accommodating chamber 1, the sealing requirement on the camera module 100 is low, design improvement to an existing device is small, and the universality is high.

In some implementations, the electronic device may include a first humidity monitoring apparatus 2 arranged inside the accommodating chamber 1, the first humidity monitoring apparatus 2 is configured to monitor the internal humidity of the accommodating chamber 1, for example, when the first humidity monitoring apparatus 2 monitors that the internal humidity of the accommodating chamber 1 is greater than a preset humidity value, the opening/closing piece 4 is controlled to be at the second position. The preset humidity value may be set according to actual requirements, for example, the humidity value monitored at an average temperature is higher than the preset value when the mist is prone to occurring. In other implementations, the electronic device may further include a second humidity monitoring apparatus 3 arranged outside the accommodating chamber 1, the second humidity monitoring apparatus 3 is configured to monitor the external humidity of the accommodating chamber 1, for example, when the second humidity monitoring apparatus 3 monitors that the external humidity of the accommodating chamber 1 is greater than a preset humidity value, the first position of the opening/closing piece 4 is maintained, that is, the accommodating chamber 1 is maintained to be closed.

In some other implementations, the first humidity monitoring apparatus 2 and the second humidity monitoring apparatus 3 may be respectively arranged inside and outside the accommodating chamber 1. In this way, by respectively arranging the humidity monitoring apparatuses inside and outside the accommodating chamber 1, the humidity inside and outside the accommodating chamber 1 may be monitored. The opening/closing piece 4 is configured to be at the second position when the internal humidity of the accommodating chamber 1 is greater than the external humidity, the first opening 12 is opened, so as to reduce the internal humidity of the accommodating chamber 1, the interior of the accommodating chamber is kept in a dry state, and formation of the mist on the light-permeable piece 200 due to excessive humidity is prevented. The opening/closing piece 4 may be connected with the first humidity monitoring apparatus 2 and the second humidity monitoring apparatus 3 through a controller, that is, the opening/closing piece 4 and the humidity monitoring apparatuses belong to an indirect connection, specifically, the first humidity monitoring apparatus 2 and the second humidity monitoring apparatus 3 transmit monitoring signals to the controller respectively, and output the result to the opening/closing piece 4 through a humidity comparison module internally arranged in the controller.

The electronic device of the disclosure may further include an air-permeable piece 5 arranged at the first opening 12, the air-permeable piece 5 has a hole configured to allow water to penetrate through in a gaseous form. For example, the air-permeable piece 5 may be selected from a waterproof and air-permeable film, the film has the characteristics that under the water vapor state, water particles are very small, according to the principle of capillary motion, the water particles may smoothly permeate into the other side of a capillary, so that a vapor permeating phenomenon occurs. After water vapor condensates to become water drop, the particles become large, due to the action of surface tension of the water drop, water molecules cannot be smoothly separated from the water drop to permeate into the other side, the occurrence of permeating of water is further prevented, and the film has a function of waterproof. In addition, an air-permeable type hydrophobic film may further achieve the similar function, which is not repeated here. In short, the air-permeable piece 5 enables the first opening 12 not to introduce water into the accommodating chamber 1 to cause increasing of the humidity in the opening state.

Mist is easy to form on a surface of the light-permeable piece 200 facing the interior of the accommodating chamber 1, in view of this, in some implementations, the first humidity monitoring apparatus 2 may be arranged at a position, adjacent to the transmitting piece 200, of the accommodating chamber 1, the adjacent position may be the position closest to the light-permeable piece 200 without shielding the light-permeable piece 200, in this way, a response speed of the first humidity monitoring apparatus 2 to the monitoring result in an adjacent region of the light-permeable piece 200 can be increased, the situation that the first humidity monitoring apparatus 2 to monitor the change of humidity lag behind the mist has been produced on the light-permeable piece 200, longer time is required to eliminate the produced mist, and normal use of the device is affected is avoided.

Figure 3:
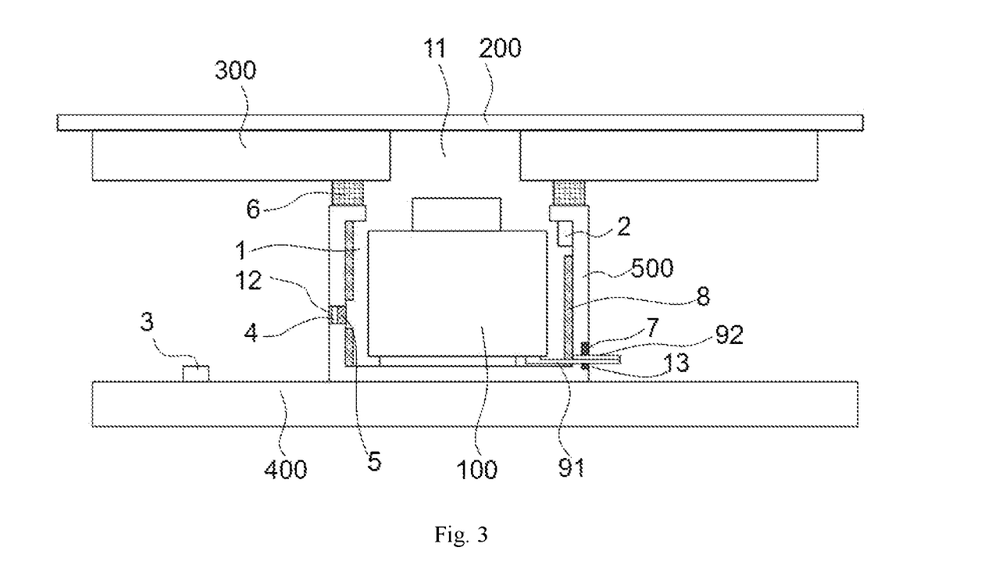
FIG. 3 is a partial schematic diagram of yet another electronic device illustrated according to an example.

As the described above solution, a relatively dry environment inside the accommodating chamber 1 is maintained by making the air pressure inside and outside the accommodating chamber 1 equal and thus the humidity equal. In a situation that unable to reduce the humidity, for example, in a product assembly scene, the external environment itself needs a certain humidity environment due to technological requirements, makes the humidity inside and outside the accommodating chamber 1 is high, or the mist has been produced and it is urgent to remove the mist. In order to adapt to these scenes, as shown in FIG. 3, the electronic device may further include a heating piece 8 arranged inside the accommodating chamber 1. The heating piece 8 may adopt materials such as heater strips.

Taking the mobile phone as an example, in the product assembly scene, such as in a mobile phone rear cover and mobile phone semi-finished product assembly process, after the camera module 100 is put into the accommodating chamber 1, the heating piece 8 is started, so as to reduce the internal humidity of the accommodating chamber 1, and after it is ensured that the rear cover is fastened, air in the accommodating chamber 1 is in a dry state. However, in daily use scenarios, the outside environment temperature is low, resulting in low temperature of the mobile phone complete machine, and when not in use scenarios, the heating piece 8 is started to heat the air in the accommodating chamber 1. In addition, the first opening 12 may be opened while the heating piece 8 is started, a dehumidification operation is performed on the interior of the accommodating chamber 1, so that the internal humidity of the accommodating chamber 1 is always maintained a low level.

As previously mentioned, a low temperature and a high humidity are necessary elements to form mist, in some implementations, the electronic device may further include a temperature monitoring apparatus 14 which is configured to start the heating piece 8 when the internal temperature of the electronic device is lower than a preset temperature value. The preset value may be set according to actual requirements, for example, a temperature value when the temperature value monitored under the average humidity is lower than the preset value, and it is easy to form mist. The range of the average humidity may be set based on scenario of daily use of the electronic device. The first opening 12 may be opened or closed independently according to a monitoring result of the temperature monitoring apparatus 14, may also be opened or closed comprehensively according to the temperature monitoring apparatus 14 and a humidity difference inside and outside the accommodating chamber 1.

Figure 2:
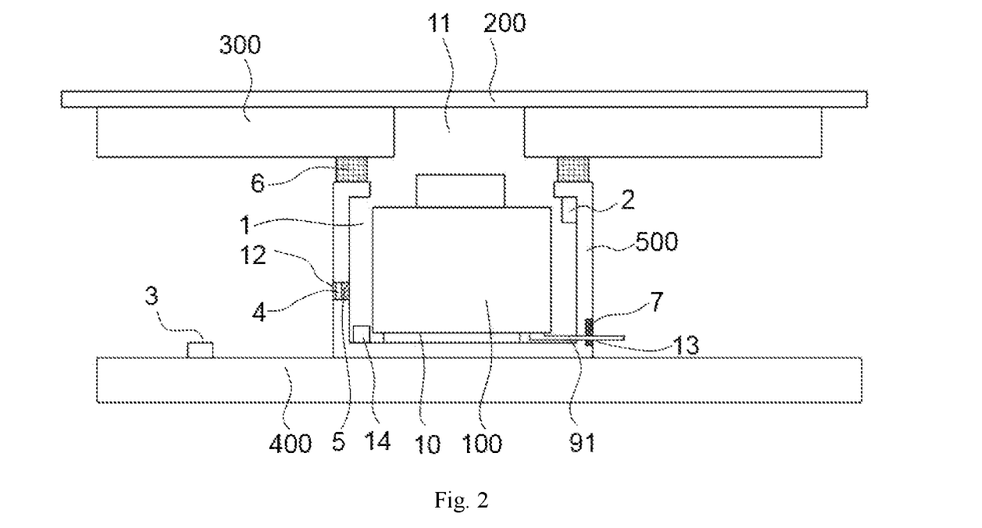
FIG. 2 is a partial schematic diagram of another electronic device illustrated according to an example.

The disclosure is not intended to limit a formation mode of the accommodating chamber 1, any structures capable of forming internal sealing spaces to accommodate the camera module 100 may be applied to the disclosure to solve the technical problems. In order to fully using the structure of the electronic device itself, that is, the disclosure is implemented on the basis of performing minimum improvement on the electronic device, as shown in FIG. 1 to FIG. 3, the accommodating chamber 1 may be formed by enclosing an electronic device cover 300 and a mainboard 400 which are arranged at intervals and an accommodating piece 500 arranged between the electronic device cover 300 and the mainboard 400, that is, the original electronic device cover 300 and the mainboard 400 of the electronic device are fully used, changes to the original electronic device are small, and the universality is high.

A heat-conducting piece 10, such as a heat-conducting copper billet, may further be arranged between the accommodating piece 500 and the camera module 100. The first opening 12 is arranged on the accommodating piece 500, one side, opposite to the photosensitive component of the camera module 100, of the electronic device cover 300 is provided with a second opening 11, and the light-permeable piece 200 covers the second opening 11. The accommodating piece 500 may be configured to be of an integrated structure with a top opening, and the top opening of the accommodating piece 500 corresponds to the second opening 11 in position, so as to accommodate the camera module 100. For example, as shown in FIGS. 1 to 3, the accommodating piece 500 is configured to be of a box type structure with a top opening, the integrated structure enables the accommodating piece 500 to be independently manufactured and conveniently disassembled and assembled, and the opening corresponds to the light-permeable piece 200 in position to avoid shielding of rays to permeate. In addition, the box type structure further has a better structural strength.

In order to ensure the sealing of the accommodating chamber 1, the position, in contact with the electronic device cover 300 and/or the mainboard 400, of the accommodating piece 500 is provided with a first sealing piece 6, the first sealing piece 6, for example, may be sealing foam. Specifically, as shown in FIG. 2 and FIG. 3, the position, in contact with the electronic device cover 300, of the accommodating piece 500 may be provided with the first sealing piece 6, or the position, in contact with the mainboard 400, of the accommodating piece 500 is provided with the first sealing piece 6, or the positions, in contact with the electronic device cover 300 and the mainboard 400, of the accommodating piece 500 are provided with the first sealing piece 6.

In addition, in order to facilitate the connection of components of the internal accommodating chamber 1 to the external mainboard 400, the accommodating chamber 1 may further be provided with a third opening 13 which is configured to allow a heating piece FPC 92 and a camera module FPC 91 and other flexible printed circuit boards (FPCs) to penetrate out, the third opening 13 is provided with a second sealing piece 7, and the second sealing piece 7, for example, may be heat-resisting glue and has a function of sealing the accommodating chamber 1.

Figure 4:
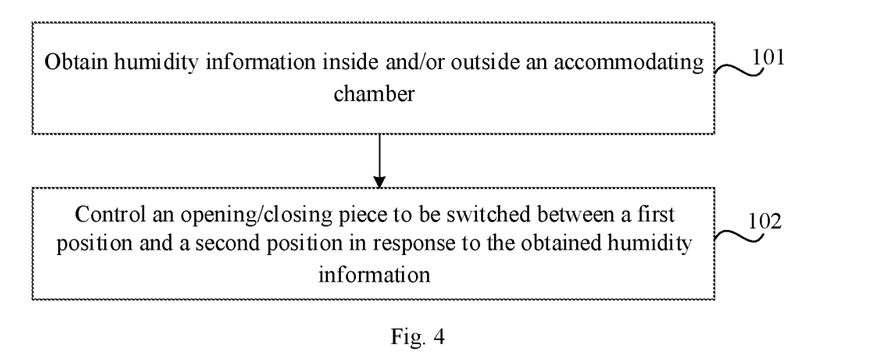
FIG. 4 is a flow diagram of a method for controlling an electronic device illustrated according to an example.

According to a second aspect of the implementations of the disclosure, a control method is further provided and can be configured to control the electronic device of the above any implementations. As shown in FIG. 4, the method for controlling the electronic device includes: step S101, obtaining the humidity information inside and/or outside the accommodating chamber 1, where the humidity information may include a humidity value inside an accommodating chamber 1, or a humidity value outside the accommodating chamber 1, or humidity values inside and outside the accommodating chamber 1 which are simultaneously monitored; and step S102, an opening/closing piece 4 is controlled to be switched between a first position and a second position in response to the obtained humidity information. The humidity information may be a humidity value inside the accommodating chamber 1 monitored by the first humidity monitoring apparatus 2, or a humidity value outside the accommodating chamber 1 monitored by the second humidity monitoring apparatus 3, or a humidity value inside the accommodating chamber 1 and a humidity value outside the accommodating chamber 1 monitored respectively by the first humidity monitoring apparatus 2 and the second humidity monitoring apparatus 3.

Figure 5:
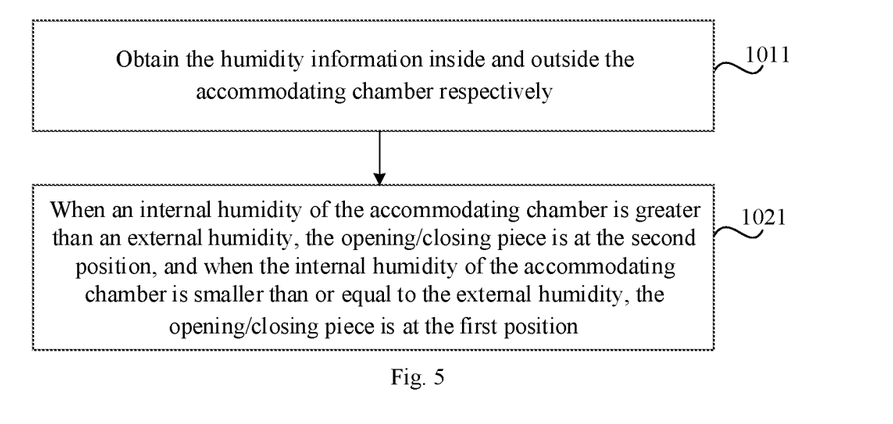
FIG. 5 a flow diagram of another method for controlling an electronic device illustrated according to an example.

In some implementations, as shown in FIG. 5, step 1011, the electronic device respectively obtains the humidity information, such as a humidity value inside the accommodating chamber 1 and a humidity value outside the accommodating chamber 1 monitored respectively by the first humidity monitoring apparatus 2 and the second humidity monitoring apparatus 3, inside and outside the accommodating chamber 1. The step of controlling the opening/closing piece 4 to be switched between the first position and the second position in response to the obtained humidity information includes: S1021, when the internal humidity of the accommodating chamber 1 is greater than the external humidity, the opening/closing piece 4 is at the second position, at the moment, the first opening 12 is opened, the air pressure has difference due to different humidity inside and outside the accommodating chamber 1, in order to maintain the balance of the air pressure, the air inside and outside the accommodating chamber 1 flows, such as an air direction in FIG. 1, the final result is to enable the internal humidity of the accommodating chamber 1 to be reduced, and the interior of the accommodating chamber 1 is kept dry. When the internal humidity of the accommodating chamber 1 is smaller than or equal to the external humidity, the opening/closing piece 4 is at the first position, and at the moment, the first opening 12 is closed.

Figure 6:
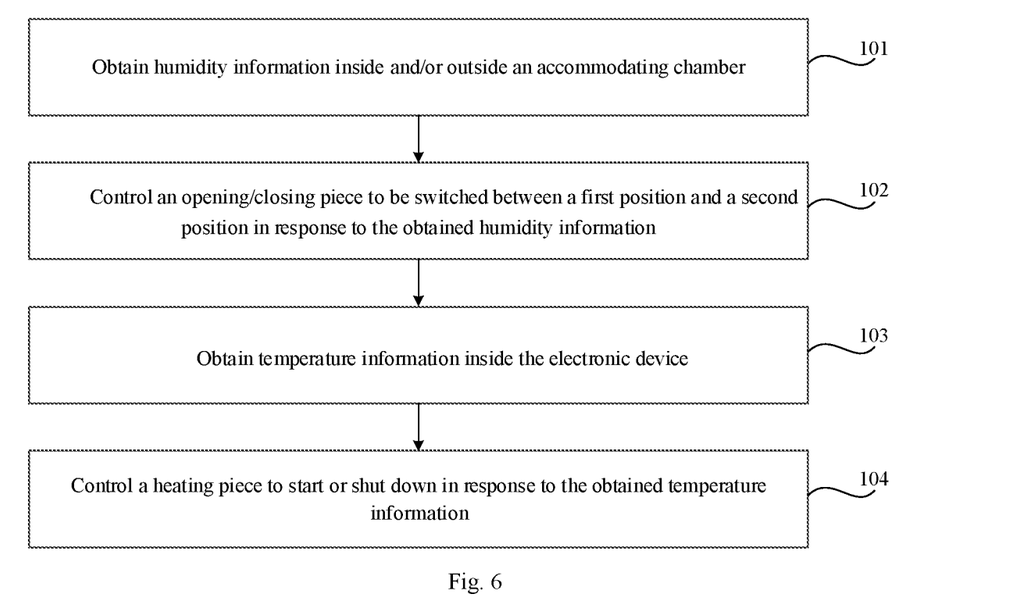
FIG. 6 is a flow diagram of yet another method for controlling an electronic device illustrated according to an example.

In some other implementations, as shown in FIG. 6, the electronic device further includes a heating piece 8 arranged in the accommodating chamber 1. The method for controlling the electronic device further includes: step S103, obtaining the temperature information inside the electronic device, where the temperature information may be monitored by a temperature monitoring apparatus; and step S104, the heating piece 8 is controlled to start or shut down in response to the obtained temperature information.

Figure 7:
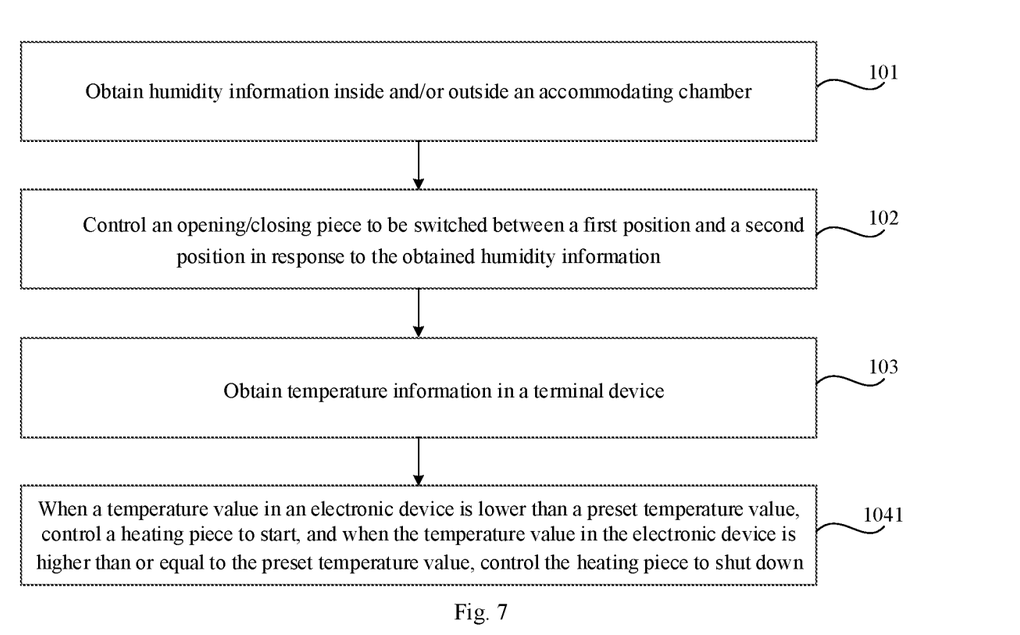
FIG. 7 is a flow diagram of yet another method for controlling an electronic device illustrated according to an example.

In some other implementations, as shown in FIG. 7, the temperature information inside the electronic device at least includes a temperature value inside the electronic device. The step of controlling the heating piece 8 to start or shut down includes: S1041, when the temperature value inside the electronic device is lower than a preset temperature value, the heating piece 8 is controlled to start, and when the temperature value inside the electronic device is higher than or equal to the preset temperature value, the heating piece 8 is controlled to shut down.

Other implementation solutions of the disclosure will readily occur to those skilled in the art upon consideration of the specification and practice of the disclosure. The disclosure is intended to cover any variations, use or adaptations of the disclosure that follow the general principles of the disclosure and include common knowledge or techniques in the technical field not disclosed by the disclosure. The specification and examples are to be regarded as examples merely, with the true scope and spirit of the disclosure being indicated by the following claims.

It should be understood that the disclosure is not limited to the accurate structures described above and illustrated in the accompanying drawings, and that various modifications and variations can be made without departing from its scope. The scope of the disclosure is limited merely by the appended claims.

Embodiments

A first embodiment includes an electronic device, including an accommodating chamber configured to accommodate a camera module, one side, opposite to a photosensitive component of the camera module, of the accommodating chamber being provided with a light-permeable piece, the accommodating chamber being provided with a first opening communicating an interior with an exterior of the accommodating chamber, the first opening being provided with an opening/closing piece having a first position and a second position, wherein, the opening/closing piece is configured to close the first opening to seal the accommodating chamber at the first position and to open the first opening to discharge moist airflow at the second position.

A second embodiment includes the electronic device of embodiment 1, where the opening/closing piece is configured to be at the second position in response to determining that an internal humidity of the accommodating chamber is greater than an external humidity, and to be at the first position in response to determining that the internal humidity of the accommodating chamber is smaller than or equal to the external humidity.

A third embodiment includes the electronic device of embodiment 1, further including: where a first humidity monitoring apparatus arranged in the accommodating chamber, wherein the first humidity monitoring apparatus is configured to monitor an external humidity of the accommodating chamber; and/or, a second humidity monitoring apparatus arranged outside the accommodating chamber, wherein the second humidity monitoring apparatus is configured to monitor an external humidity of the accommodating chamber.

A fourth embodiment includes the electronic device of embodiment 3, where the first humidity monitoring apparatus is arranged at a position, adjacent to the light-permeable piece, of the accommodating chamber.

A fifth embodiment includes the electronic device of embodiment 1, further including: an air-permeable piece arranged at the first opening, wherein the air-permeable piece has a hole configured to allow water to penetrate in a gaseous form.

A sixth embodiment includes the electronic device of embodiment 1, further including: a heating piece arranged in the accommodating chamber.

A seventh embodiment includes the electronic device of embodiment 6, further including: a temperature monitoring apparatus configured to start the heating piece in response to determining that an internal temperature of the electronic device is lower than a preset temperature value.

An eighth embodiment includes the electronic device of embodiment 1, where the accommodating chamber is formed by enclosing an electronic device cover, a mainboard spaced from the electronic device cover, and an accommodating piece arranged between the electronic device cover and the mainboard, wherein the first opening is arranged on the accommodating piece, and one side, opposite to the photosensitive component of the camera module, of the electronic device cover is provided with a second opening, wherein the light-permeable piece covers the second opening.

A ninth embodiment includes the electronic device of embodiment 8, where the accommodating piece is of an integrated structure with a top opening, and the top opening corresponds to the second opening in position.

A tenth embodiment includes the electronic device of embodiment 8, where a position, in contact with the electronic device cover and/or the mainboard, of the accommodating piece is provided with a first sealing piece.

An eleventh embodiment includes the electronic device of embodiment 8, where the accommodating chamber is further provided with a third opening configured to allow a flexible printed circuit board to penetrate, and the third opening is provided with a second sealing piece.

A twelfth embodiment includes a method for controlling the electronic device according to any one of embodiments 1 to 11, where the method for controlling the electronic device includes:

obtaining humidity information inside and/or outside an accommodating chamber; and controlling an opening/closing piece to be switched between a first position and a second position in response to the obtained humidity information.

A thirteenth embodiment includes the method for controlling the electronic device of embodiment 12, where the step of obtaining at least one of the humidity information inside and outside the accommodating chamber comprises:

obtaining the humidity information inside and outside the accommodating chamber respectively;

the step of controlling the opening/closing piece to be switched between the first position and the second position in response to the obtained humidity information comprises:

in response to determining that an internal humidity of the accommodating chamber is greater than an external humidity, the opening/closing piece being at the second position, and in response to determining that the internal humidity of the accommodating chamber is smaller than or equal to the external humidity, the opening/closing piece being at the first position.

A fourteenth embodiment includes the method for controlling the electronic device of embodiment 12 or 13, where the electronic device further comprises a heating piece arranged in the accommodating chamber, and the method for controlling the electronic device further comprises:

obtaining temperature information inside the electronic device; and controlling the heating piece to start or shut down in response to the obtained temperature information.

A fifteenth embodiment includes the method for controlling the electronic device of embodiment 14, where the temperature information inside the electronic device at least comprises: a temperature value inside the electronic device; and the step of controlling the heating piece to start or shut down in response to the obtained temperature information comprises:

in response to determining that the temperature value inside the electronic device is lower than a preset temperature value, controlling the heating piece to start; and in response to determining that the temperature value inside the electronic device is higher than or equal to the preset temperature value, controlling the heating piece to shut down.

DESCRIPTION OF REFERENCE NUMERALS

100—camera module
200—light-permeable piece
300—electronic device cover
400—mainboard
500—accommodating piece
1—accommodating chamber
11—second opening
12—first opening
13—third opening
14—temperature monitoring apparatus
2—first humidity monitoring apparatus
3—second humidity monitoring apparatus
4—opening/closing piece
5—air-permeable piece
6—first sealing piece
7—second sealing piece
8—heating piece
91—camera module FPC
92—heating piece FPC
10—heat-conducting piece

The invention claimed is:

1. An electronic device, comprising an accommodating chamber configured to accommodate a camera module, one side, opposite to a photosensitive component of the camera module, of the accommodating chamber being provided with a light-permeable piece, the accommodating chamber being provided with a first opening communicating an interior with an exterior of the accommodating chamber, wherein the accommodating chamber is formed by enclosing an electronic device cover, a mainboard spaced from the electronic device cover, and an accommodating piece arranged between the electronic device cover and the mainboard, wherein the first opening is arranged on the accommodating piece, and one side, opposite to the photosensitive component of the camera module, of the electronic device cover is provided with a second opening, wherein the light-permeable piece covers the second opening, the first opening being provided with an opening/closing piece having a first position and a second position, and wherein the opening/closing piece is configured to close the first opening to seal the accommodating chamber at the first position and to open the first opening to discharge moist airflow at the second position.

2. The electronic device according to claim 1, wherein the opening/closing piece is configured to be at the second position in response to determining that an internal humidity of the accommodating chamber is greater than an external humidity, and to be at the first position in response to determining that the internal humidity of the accommodating chamber is smaller than or equal to the external humidity.

3. The electronic device according to claim 1, further comprising at least one of a first humidity monitoring apparatus and a second humidity monitoring apparatus, the first humidity monitoring apparatus arranged inside the accommodating chamber, wherein the first humidity monitoring apparatus is configured to monitor an external humidity of the accommodating chamber;
the second humidity monitoring apparatus arranged outside the accommodating chamber, wherein the second humidity monitoring apparatus is configured to monitor the external humidity of the accommodating chamber.

4. The electronic device according to claim 3, wherein the first humidity monitoring apparatus is arranged at a position, adjacent to the light-permeable piece, of the accommodating chamber.

5. The electronic device according to claim 1, further comprising an air-permeable piece arranged at the first opening, wherein the air-permeable piece has a hole configured to allow water to penetrate in a gaseous form.

6. The electronic device according to claim 1, further comprising a heating piece arranged in the accommodating chamber.

7. The electronic device according to claim 6, further comprising a temperature monitoring apparatus configured to start the heating piece in response to determining that an internal temperature of the electronic device is lower than a preset temperature value.

8. The electronic device according to claim 1, wherein the accommodating piece is of an integrated structure with a top opening, and the top opening corresponds to the second opening in position.

9. The electronic device according to claim 1, wherein a position, in contact with at least one of the electronic device cover and the mainboard, of the accommodating piece is provided with a first sealing piece.

10. The electronic device according to claim 1, wherein the accommodating chamber is further provided with a third opening configured to allow a flexible printed circuit board to penetrate, and the third opening is provided with a second sealing piece.

11. A method for controlling an electronic device, wherein the electronic device comprises an accommodating chamber configured to accommodate a camera module, one side, opposite to a photosensitive component of the camera module, of the accommodating chamber being provided with a light-permeable piece, the accommodating chamber being provided with a first opening communicating an interior with an exterior of the accommodating chamber, wherein the accommodating chamber is formed by enclosing an electronic device cover, a mainboard spaced from the electronic device cover, and an accommodating piece arranged between the electronic device cover and the mainboard, wherein the first opening is arranged on the accommodating piece, and one side, opposite to the photosensitive component of the camera module, of the electronic device cover is provided with a second opening, wherein the light-permeable piece covers the second opening, the first opening being provided with an opening/closing piece having a first position and a second position, and wherein the opening/closing piece is configured to close the first opening to seal the accommodating chamber at the first position and to open the first opening to discharge moist airflow at the second position; and
wherein the method for controlling the electronic device comprises:
obtaining at least one of a humidity information inside and outside the accommodating chamber; and
controlling an opening/closing piece to be switched between a first position and a second position in response to the obtained humidity information.

12. The method for controlling the electronic device according to claim 11, wherein obtaining at least one of the humidity information inside and outside the accommodating chamber comprises:
obtaining the humidity information inside and outside the accommodating chamber respectively;
wherein controlling the opening/closing piece to be switched between the first position and the second position in response to the obtained humidity information comprises:
in response to determining that an internal humidity of the accommodating chamber is greater than an external humidity, the opening/closing piece being at the second position, and in response to determining that the internal humidity of the accommodating chamber is smaller than or equal to the external humidity, the opening/closing piece being at the first position.

13. The method for controlling the electronic device according to claim 11, wherein the electronic device further comprises:
at least one of a first humidity monitoring apparatus and a second humidity monitoring apparatus, the first humidity monitoring apparatus arranged inside the accommodating chamber, wherein the first humidity monitoring apparatus is configured to monitor an external humidity of the accommodating chamber;
the second humidity monitoring apparatus arranged outside the accommodating chamber, wherein the second humidity monitoring apparatus is configured to monitor the external humidity of the accommodating chamber.

14. The method for controlling the electronic device according to claim 13, wherein the first humidity monitoring apparatus is arranged at a position, adjacent to the light-permeable piece, of the accommodating chamber.

15. The method for controlling the electronic device according to claim 11, wherein the electronic device further comprises an air-permeable piece arranged at the first opening, and wherein the air-permeable piece has a hole configured to allow water to penetrate in a gaseous form.

16. The method for controlling the electronic device according to claim 11, wherein the electronic device further comprises a heating piece arranged in the accommodating chamber, and the method for controlling the electronic device further comprises:

obtaining temperature information inside the electronic device; and controlling the heating piece to start or shut down in response to the obtained temperature information.

17. The method for controlling the electronic device according to claim 16, wherein the temperature information inside the electronic device at least comprises: a temperature value inside the electronic device; and the electronic device further comprises a temperature monitoring apparatus;

wherein controlling the heating piece to start or shut down in response to the obtained temperature information comprises:

in response to determining that the temperature value inside the electronic device is lower than a preset temperature value, controlling the heating piece to start; and in response to determining that the temperature value inside the electronic device is higher than or equal to the preset temperature value, controlling the heating piece to shut down.

18. The method for controlling the electronic device according to claim 11, wherein the accommodating piece is of an integrated structure with a top opening, and the top opening corresponds to the second opening in position.

* * * * *